(12) United States Patent
Cote

(10) Patent No.: US 10,583,379 B2
(45) Date of Patent: Mar. 10, 2020

(54) SEPARATOR AND METHOD FOR SEPARATING A HETEROGENEOUS SUPPLY

(71) Applicant: MACHINERIE AGRICOLE BOIS-FRANCS INC., Warwick (CA)

(72) Inventor: Camille Cote, Warwick (CA)

(73) Assignee: MACHINERIE AGRICOLE BOIS-FRANCS INC., Warwick (CA)

( * ) Notice: Subject to any disclaimer, the term of this patent is extended or adjusted under 35 U.S.C. 154(b) by 0 days.

(21) Appl. No.: 15/797,046

(22) Filed: Oct. 30, 2017

(65) Prior Publication Data

US 2018/0056214 A1  Mar. 1, 2018

Related U.S. Application Data

(63) Continuation of application No. 13/666,562, filed on Nov. 1, 2012, now abandoned.

(51) Int. Cl.
*B01D 33/11* (2006.01)
*B01D 33/067* (2006.01)
*B01D 33/50* (2006.01)

(52) U.S. Cl.
CPC ............ *B01D 33/11* (2013.01); *B01D 33/067* (2013.01); *B01D 33/503* (2013.01)

(58) Field of Classification Search
None
See application file for complete search history.

(56) References Cited

U.S. PATENT DOCUMENTS

| | | | | |
|---|---|---|---|---|
| 1,002,618 A * | 9/1911 | Winkler | ................. | B01D 46/26 55/290 |
| 1,210,759 A * | 1/1917 | Breddin | ................. | E02B 1/006 210/156 |
| 1,726,608 A * | 9/1929 | Brackett | ................. | B01D 33/11 210/161 |
| 1,977,601 A * | 10/1934 | Winton | ................. | F16L 55/24 210/411 |
| 1,995,648 A * | 3/1935 | Rathbun | ............ | B01D 46/0065 55/294 |
| 1,995,649 A * | 3/1935 | Rathbun | ............ | B01D 46/0065 55/294 |
| 2,066,479 A * | 1/1937 | MacIsaac | ................. | B01D 29/01 210/193 |
| 2,275,958 A * | 3/1942 | Hagel | .................... | B01D 35/02 210/408 |

(Continued)

*Primary Examiner* — Robert J Popovics

(57) ABSTRACT

A separator and method for separating a heterogeneous supply into a liquid and a solid material. The separator includes a casing in which the supply can collect, and which has an inlet for receiving the supply and an outlet for conveying the supply. The separator also includes a screen which rotates relative to the casing. The screen has perforated sections having a plurality of perforations which permit passage of the liquid. The screen allows for the accumulation of the supply within it, which rises to a level corresponding to a supply height. As this supply height, a screening pressure acts against the perforated sections so as to compact the solid material against the perforations while the liquid passes therethrough. A suction unit sucks the compacted solid material from the perforations, and is disposed higher than the supply height. A supply level regulator regulates the level of the supply within the screen.

17 Claims, 8 Drawing Sheets

(56) References Cited

U.S. PATENT DOCUMENTS

| | | | | |
|---|---|---|---|---|
| 2,835,390 A * | 5/1958 | King | ............... | B01D 29/25 210/411 |
| 3,017,029 A * | 1/1962 | Berninger | ............ | B01D 29/23 210/108 |
| 3,074,556 A * | 1/1963 | Rosaen | ............... | B01D 33/11 210/195.1 |
| 3,074,560 A * | 1/1963 | Kinney | ............... | B01D 33/11 210/330 |
| 3,168,467 A * | 2/1965 | Dreyer | ............... | B01D 29/23 210/108 |
| 3,256,995 A * | 6/1966 | Schmid | ............... | B01D 29/071 210/411 |
| 3,357,566 A * | 12/1967 | Schmid | ............... | B01D 29/118 210/333.01 |
| 3,377,780 A * | 4/1968 | Noland | ............... | B01D 46/0065 55/294 |
| 3,574,509 A * | 4/1971 | Zentis | ............... | B01D 29/23 210/107 |
| 3,635,348 A * | 1/1972 | Carr | ............... | B01D 29/35 210/333.1 |
| 3,734,299 A * | 5/1973 | Akiyama | ............ | B01D 29/15 210/333.1 |
| 3,757,496 A * | 9/1973 | Berg | ............... | B01D 46/0013 55/293 |
| 3,784,016 A * | 1/1974 | Akiyama | ............ | B01D 29/114 210/333.1 |
| 3,837,149 A * | 9/1974 | West | ............... | B01D 46/26 180/68.1 |
| 3,864,256 A * | 2/1975 | Hultsch | ............... | B01D 33/11 210/781 |
| 3,887,344 A * | 6/1975 | Smith | ............... | B01D 46/0065 285/405 |
| 3,943,056 A * | 3/1976 | Hultsch | ............... | B01D 33/11 210/781 |
| 4,052,303 A * | 10/1977 | Hultsch | ............... | B01D 33/11 210/781 |
| 4,085,051 A * | 4/1978 | Kaminsky | ............ | B01D 29/018 210/333.01 |
| 4,154,588 A * | 5/1979 | Herndon, Jr. | ...... | B01D 46/0065 55/283 |
| 4,162,219 A * | 7/1979 | Miropolsky | ......... | B01D 29/055 210/108 |
| 4,222,754 A * | 9/1980 | Horvat, IV | ............ | B01D 46/26 55/283 |
| 4,251,237 A * | 2/1981 | Smith | ............... | B01D 46/0065 55/294 |
| 4,280,913 A * | 7/1981 | Applegate | ............ | B01D 33/067 210/669 |
| 4,532,036 A * | 7/1985 | Clifford | ............... | B01D 29/23 210/167.01 |
| 4,643,828 A * | 2/1987 | Barzuza | ............... | B01D 29/23 210/412 |
| 4,661,252 A * | 4/1987 | Burgess | ............... | B01D 29/44 210/402 |
| 4,702,847 A * | 10/1987 | Fux | ............... | B01D 21/0012 210/798 |
| 4,780,151 A * | 10/1988 | Barzuza | ............... | B01D 29/031 134/21 |
| 4,810,270 A * | 3/1989 | Terry | ............... | B01D 46/0046 209/274 |
| 4,818,402 A * | 4/1989 | Steiner | ............... | B01D 29/23 210/411 |
| 4,849,105 A * | 7/1989 | Borchert | ............... | B01D 29/33 210/408 |
| 4,859,335 A * | 8/1989 | Whyte | ............... | B01D 29/114 210/393 |
| 4,867,879 A * | 9/1989 | Muller | ............... | B01D 29/035 210/392 |
| 4,875,913 A * | 10/1989 | Barzuza | ............... | B01D 29/031 55/294 |
| 4,898,671 A * | 2/1990 | Fux | ............... | B01D 21/0012 210/333.01 |
| 4,904,397 A * | 2/1990 | Eimer | ............... | B01D 29/055 210/333.1 |
| 5,116,490 A * | 5/1992 | Fontenot | ............... | B01D 33/50 210/158 |
| 5,152,891 A * | 10/1992 | Netkowicz | ............ | B01D 29/23 210/408 |
| 5,164,079 A * | 11/1992 | Klein | ............... | B01D 29/117 210/186 |
| 5,268,095 A * | 12/1993 | Barzuza | ............... | B01D 29/01 210/143 |
| 5,275,728 A * | 1/1994 | Koller | ............... | B01D 29/117 210/391 |
| 5,300,225 A * | 4/1994 | Fischer | ............... | B01D 33/073 210/391 |
| 5,370,791 A * | 12/1994 | Lescovich | ............ | B01D 29/118 210/107 |
| 5,401,396 A * | 3/1995 | Lescovich | ............ | B01D 29/118 210/108 |
| 5,464,542 A * | 11/1995 | Grienberger | ........... | B01D 29/15 210/784 |
| 5,549,825 A * | 8/1996 | Barzuza | ............... | B01D 29/232 210/411 |
| 5,558,042 A * | 9/1996 | Bradley | ............... | A01K 63/045 119/226 |
| 5,587,074 A * | 12/1996 | Lynch | ............... | B01D 29/23 210/411 |
| 5,632,903 A * | 5/1997 | Caracciolo, Jr. | ...... | B01D 29/117 210/333.01 |
| 5,728,297 A * | 3/1998 | Koller | ............... | B01D 29/23 210/407 |
| 5,735,337 A * | 4/1998 | Edwards | ............... | A01G 3/08 165/119 |
| 5,779,901 A * | 7/1998 | Mosca | ............... | B01D 29/117 210/411 |
| 5,824,229 A * | 10/1998 | Larkey | ............... | B01D 29/117 210/741 |
| 5,855,794 A * | 1/1999 | Caracciolo, Jr. | ...... | B01D 29/117 210/107 |
| 6,337,013 B1 * | 1/2002 | Koopmans | ............ | B01D 29/23 210/232 |
| 6,360,896 B1 * | 3/2002 | Schildmann | ......... | B01D 29/014 210/411 |
| 6,497,815 B1 * | 12/2002 | Koller | ............... | B01D 29/014 210/130 |
| 6,500,331 B2 * | 12/2002 | Massignani | ............ | B01D 33/15 210/155 |
| 6,572,763 B2 * | 6/2003 | Gorshing | ............... | B01D 29/115 210/159 |
| 7,258,238 B2 * | 8/2007 | Raghupathy | ........... | B01D 29/35 210/411 |
| 7,294,257 B2 * | 11/2007 | Jackson | ............... | A01K 63/045 119/259 |
| 7,297,265 B1 * | 11/2007 | Booth | ............... | B01D 29/23 210/304 |
| 7,946,367 B2 * | 5/2011 | Good | ............... | B01D 46/0056 180/68.1 |
| 7,998,245 B2 * | 8/2011 | Demonie | ............ | B01D 46/0056 460/102 |
| 8,097,050 B2 * | 1/2012 | Johnson | ............... | B01D 46/0065 460/102 |
| 8,496,117 B2 * | 7/2013 | Leath, III | ............... | B01D 33/11 210/373 |
| 8,524,075 B1 * | 9/2013 | Quintel | ............... | B01D 29/232 210/108 |
| 8,679,335 B1 * | 3/2014 | Dufort | ............... | B01D 35/02 134/104.4 |
| 9,211,489 B2 * | 12/2015 | Riggers | ............... | B01D 29/6476 |
| 9,561,454 B2 * | 2/2017 | Browning | ............ | B01D 29/035 |
| 9,968,872 B2 * | 5/2018 | Carayon | ............... | B01D 33/801 |
| 10,195,549 B1 * | 2/2019 | Grabbe | ............... | B01D 29/68 |
| 10,245,531 B2 * | 4/2019 | Steiner | ............... | B01D 29/23 |
| 10,391,429 B2 * | 8/2019 | Carayon | ............... | B01D 33/503 |
| 2001/0054591 A1 * | 12/2001 | Gorshing | ............... | B01D 29/115 210/769 |
| 2012/0248018 A1 * | 10/2012 | Hopf | ............... | B01D 29/333 210/158 |

(56) References Cited

U.S. PATENT DOCUMENTS

| | | | |
|---|---|---|---|
| 2013/0032515 A1* | 2/2013 | Carayon | B01D 33/801 |
| | | | 210/158 |
| 2014/0097145 A1* | 4/2014 | Browning | B01D 29/035 |
| | | | 210/780 |
| 2014/0116965 A1* | 5/2014 | Cote | B01D 33/11 |
| | | | 210/784 |
| 2016/0001211 A1* | 1/2016 | Dietz | B01D 46/2403 |
| | | | 96/397 |
| 2017/0036143 A1* | 2/2017 | Van den Berg | B01D 33/073 |
| 2018/0056214 A1* | 3/2018 | Cote | B01D 33/11 |
| 2018/0071663 A1* | 3/2018 | Carayon | B01D 33/073 |

* cited by examiner

SEPARATOR AND METHOD FOR SEPARATING A HETEROGENEOUS SUPPLY

FIELD OF THE INVENTION

The present invention relates to the separation of substantially-liquid mixtures into liquid and solid materials. More particularly, the present invention relates to a separator and a method for separating a heterogeneous supply into a liquid and solid material, and for extracting the solid material.

BACKGROUND OF THE INVENTION

Septic tanks collect and store human waste. They are often required where municipal or local sewerage is inadequate or inaccessible.

When a septic tank reaches its capacity it needs to be emptied. Over time, the human waste collected and stored in the septic tank usually breaks down into three distinct components: solids that have settled at the bottom of the tank, liquid which constitutes the bulk of the volume of the septic tank (commonly referred to as the "supernatant"), and solids which float on the liquid. When emptying the tank, it is often desirous to remove only the settled and floating solids from the tank, and to leave the liquid in the tank, or at least return it. It is known that the liquid contains beneficial bacteria and microorganisms that help to break down the human waste collected and stored in the septic tank.

U.S. Pat. No. 6,790,368 B1 to VACHON et al. proposes one technique for removing only the solids from the tank. This document relates to a method and system for the recuperation of the content of a septic tank where the supernatant is returned to the septic tank after the recuperation of the solid material and of the scum. A major portion of the supernatant is recuperated from the top of the septic tank to the bottom thereof, and stored in a first reservoir of the system. The solid material, the remainder of the supernatant, and the scum are then recuperated and stored in a second reservoir. The supernatant is filtered, either upon its recuperation or before its return to the septic tank. Finally, the filtered supernatant is returned to the septic tank.

U.S. Pat. No. 5,312,551 to PERRON et al. proposes another technique. This document relates to a mobile multi reservoir unit which aspirates liquid with solids from septic tanks, treats immediately the liquor by a flocculent polymer and dehydrates the product by a low speed vertical centrifugal machine. The liquid is returned to the septic tank and the solid is maintained in a mud state and then transferred to a storage reservoir.

Inevitably, some form of separation of the solids and liquids is performed. One technique for doing so is provided in U.S. Pat. No. 3,979,289 to BYKOWSKI et al., which relates to an internal rotary filter system. The filter screen is externally impacted as it rotates with a programmed spray of liquid that is varied from a relatively low to a relatively high pressure.

The following documents are also known: U.S. Pat. Nos. 3,515,281; 4,234,980; 4,781,763; 4,933,432; 5,178,759; JP59066318 A; JP60058218 A; JP03233035; and DE4307297 A1.

Also known are the following disadvantages associated with some of these techniques: a) they often require prefiltering whereby a specialized technician first separates the floating solid layer before running the contents through the system, which increases processing times and system complexity; b) they often require many hours to complete the separation of the tank's contents and to return the liquid to the tank which can be inconvenient for the owner of the septic tank; c) they often require skilled technicians to perform, which increases costs and reduces the availability of such techniques to laypeople; d) they often use rotary filters which have insufficient capacity to process the contents of an entire septic tank, further increasing treatment times and costs; e) etc.

Hence, in light of the aforementioned, there is a need for a system which, by virtue of their design, steps, and/or components, would be able to overcome or at least minimize some of the aforementioned prior art problems.

SUMMARY OF THE INVENTION:

The object of the present invention is to provide a system which is an improvement over other related separators or methods known in the art.

In accordance with the present invention, the above object is achieved, as will be easily understood, with a separator or a method, such as the one(s) briefly described herein and such as the one(s) exemplified in the accompanying drawings.

In accordance with a first aspect of the invention, there is provided a separator for separating a heterogeneous supply into a liquid and a solid material and for extracting the solid material, the separator comprising:

a casing for containing the supply, the casing comprising an inlet for receiving the supply and an outlet for conveying liquid out from the casing;

a screen mountable within the casing and rotatable relative to the casing, the screen comprising at least one perforated section, the at least one perforated section comprising a plurality of perforations disposed thereabout so as to permit passage of liquid therethrough, the screen being positioned, shaped, and sized for receiving the supply from the inlet of the casing such that the supply accumulates within the screen to a supply height, the supply thereby providing a screening pressure acting against the at least one perforated section so as to compact the solid material against the perforations while the liquid passes therethrough, thereby separating the liquid from the solid material;

a suction unit disposed within the screen, the suction unit comprising a suction head disposed above the supply height and positioned for extracting the solid material from the perforations as the at least one perforated section rotates within an extractable distance from the suction head; and a supply level regulator mountable within the screen, the supply level regulator regulating a level of the supply within the screen so as to maintain the level of the supply below the supply height.

In some optional embodiments, the casing can be about 7 feet in diameter. Further optionally, the screen can include a notch which projects away from the center of the screen and allows for the passage of solid material underneath the suction unit. Further optionally, the suction unit can be a vacuum, and can include a suction extension for forming a sealed contact with the perforated sections.

In accordance with another aspect of the invention, there is provided a method for separating a heterogeneous supply into a liquid and a solid material, the method including the steps of:

a) accumulating the supply within a rotatable screen until a level of the supply reaches a supply height, the supply thereby providing a screening pressure acting against the screen so as to compact the solid material against the screen while the liquid passes therethrough;

b) maintaining the level of the supply within the screen at the supply height;

c) rotating the screen and the solid material compacted thereon; and d) extracting the solid material from the rotating screen upon the solid material being rotated to a height above the supply height.

In some optional embodiments, the screen can be rotated at a speed between about 5 rpm and about 10 rpm. Further optionally, the solid material is extracted from the screen with a suction unit.

According to yet another aspect of the present invention, there is also provided a kit with components for assembling the above-mentioned separator.

According to yet another aspect of the present invention, there is also provided a set of components for interchanging with components of the above-mentioned kit.

According to yet another aspect of the present invention, there is also provided a method of assembling components of the above-mentioned kit and/or set.

According to yet another aspect of the present invention, there is also provided liquid and solid material having been separated with the above-mentioned separator and/or method.

The objects, advantages and other features of the present invention will become more apparent upon reading of the following non-restrictive description of optional embodiments thereof, given for the purpose of exemplification only, with reference to the accompanying drawings.

BRIEF DESCRIPTION OF THE DRAWINGS

FIG. 4 is a perspective view of a screen and FIG. 4A is a close-up view of a notch provided on the screen, according to one optional configuration of the present invention.

DETAILED DESCRIPTION OF PREFERRED EMBODIMENTS OF THE INVENTION

In the following description, the same numerical references refer to similar elements. Furthermore, for the sake of simplicity and clarity, namely so as to not unduly burden the figures with several references numbers, not all figures contain references to all the components and features of the present invention and references to some components and features may be found in only one figure, and components and features of the present invention illustrated in other figures can be easily inferred therefrom. The embodiments, geometrical configurations, materials mentioned and/or dimensions shown in the figures are optional, and are provided for exemplification purposes only.

Furthermore, although the present invention may be used with a supply of organic waste, for example, and as a result, is sometimes described in the context of its use with a septic tank, it is understood that it may be used with other containers, and in other fields. These other fields include, but are not limited to, the following: mining slurries, food mixtures, pollutant mixtures, etc. For this reason, expressions such as "human waste", "septic tank", "sludge", etc. used herein should not be taken as to limit the scope of the present invention to use with only organic wastes and/or septic tanks in particular. These expressions encompass all other kinds of materials, objects and/or purposes with which the present invention could be used and may be useful.

In addition, although some of the embodiments of the present invention as illustrated in the accompanying drawings comprises various components and although some of the embodiments of the separator as shown consists of certain geometrical configurations as explained and illustrated herein, not all of these components and geometries are essential to the invention and thus should not be taken in their restrictive sense, i.e. should not be taken as to limit the scope of the present invention. It is to be understood that other suitable components and cooperations therebetween, as well as other suitable geometrical configurations may be used for the separator and corresponding parts, according to the present invention, as briefly explained herein, without departing from the scope of the invention.

Figure 1:
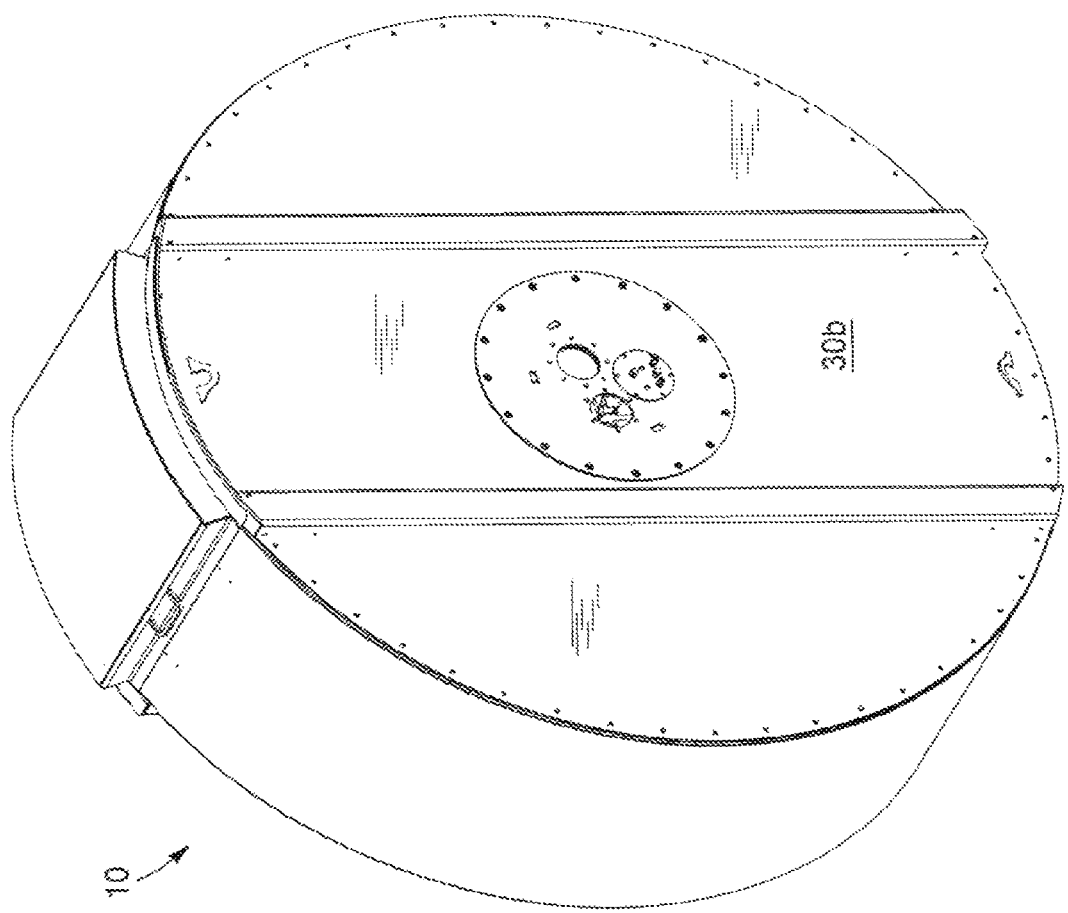
FIG. 1 is a perspective view of a separator, according to one optional configuration of the present invention.

According to one aspect of the invention, and referring to FIG. 1, there is provided a separator 10 for separating a heterogeneous supply into a liquid and a solid material and for extracting the solid material. The separator 10 allows for the division of a liquid-solid mixture into its constituent parts, i.e. into separate liquid and solid components. The separator 10 can therefore be any filter, sieve, strainer, colander, mesh, etc.

The separator 10 separates a heterogeneous supply. The expression "heterogeneous supply" refers to any mixture of at least liquid and solid material, but which may contain other materials, and in which the liquid and solid material do not perfectly blend so as to completely lose their individual characteristics. One example of such a heterogeneous supply can be found in the field of septic tanks. As previously explained, the contents of a septic tank often include solids that are settled on the bottom of the tank, or which float on a volume of liquid. Although high in moisture content, such solids are not completely dissolved in the liquid so as to lose their individual characteristics and can thus be said to be "heterogeneous" with the liquid. The term "supply" refers to the stock or provision of such a heterogeneous mixture, which can be furnished to the separator 10 by any known means such as pumping, transportation, digging, etc.

In the field of septic tanks, as but one example, it is often desirable to separate this heterogeneous supply into its constituent elements, which are the liquid, commonly referred to as the "supernatant", and the solid material. The supernatant denotes the liquid lying between the layers of settled and floating solid material. It is often desirable to extract, remove, take out, etc. this settled and floating solid material (or simply "solid material"), which is referred to in the art as "sludge", from the septic tank altogether, thereby allowing the septic tank to put back to use after it has reached or approached capacity. Once so extracted, this solid material is usually transported by truck to a site where it can be suitably stored or transformed. As previously explained, the supernatant is often returned to the septic tank.

Figure 2:
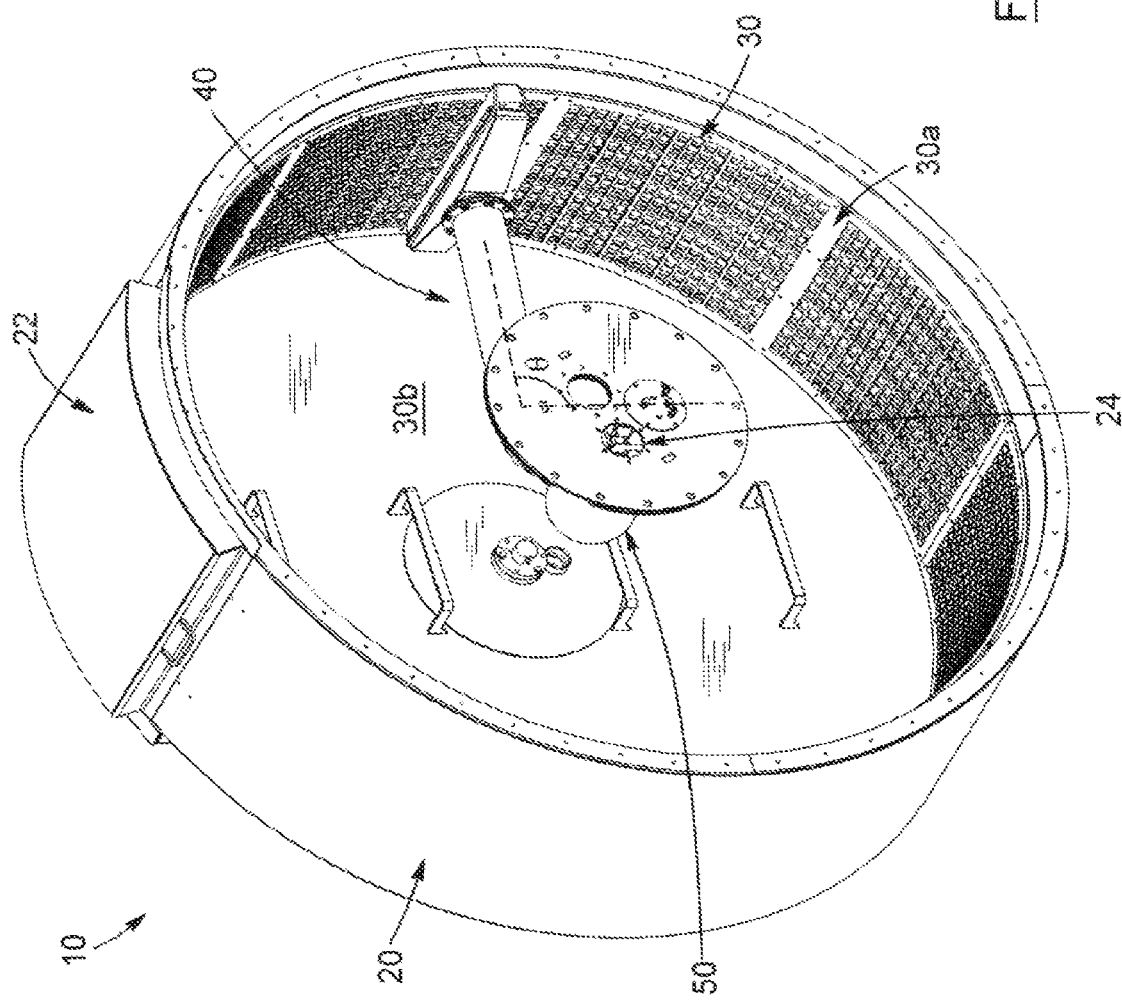
FIG. 2 is a perspective view of an interior of the separator of FIG. 1.

Referring to FIG. 2, the separator 10 has a casing 20 which contains the supply. The casing 20 receives the supply directly or indirectly from its source (i.e. a septic tank), and holds the supply within itself so that it can collect to a certain volume. The casing 20 can thus be mostly impermeable to liquid and solids such that the supply can collect therein. The casing 20 is also intended to convey the liquid separated by the separator 10 to wherever it is desired (i.e. return it to a septic tank). The casing 20 can thus be any container, box, coffer, chamber, receptacle, etc. which can receive the supply, convey the liquid, and allow the supply to accumulate within itself. As such, the shape and/or form of the casing 20 can vary. In the example provided in FIG. 2, the shape of the casing 20 is shown as "cylindrical", but any other suitable shape can be used depending on the following non-exhaustive list of factors: volume of supply to process, location where the casing 20 will be mounted, the configuration of components within the casing 20, etc. The casing 20 can be made of any suitable material which can resist the corrosive nature of the matter contained therein, and which can resists the cyclical and/or static forces acting against it while the supply is processed. One example of such a material includes an aluminum alloy. The casing 20 can also include handles, grips, etc. which are suitably mounted about the casing 20 as to permit hoisting of the casing 20 for the purposes of mounting, transporting, removing, etc.

Figure 7:
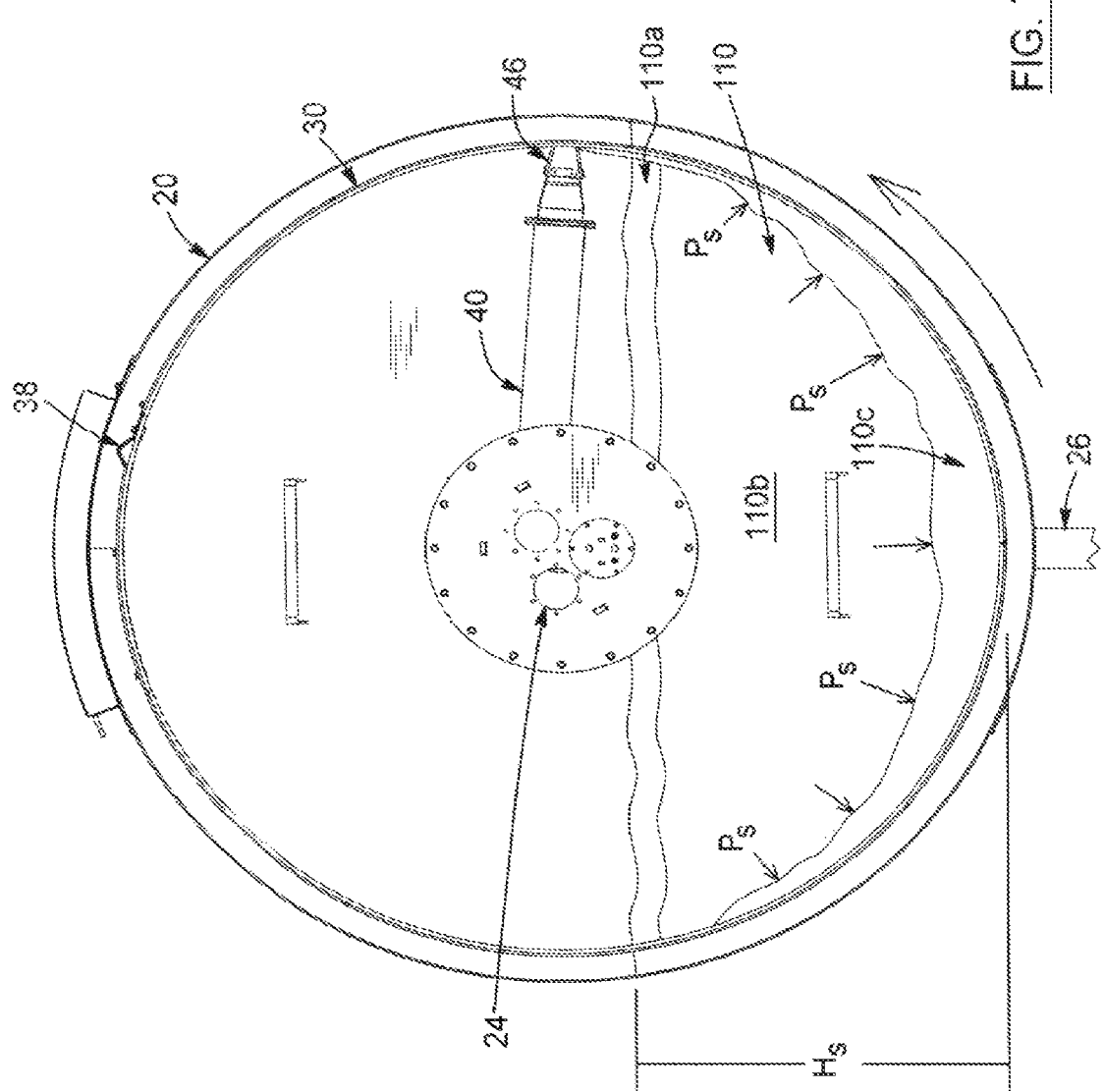
FIG. 7 is an exposed side elevational view of the separator of FIG. 1 showing a liquid and a solid material.

The casing 20 receives the supply through an inlet 24, and conveys the liquid so separated through an outlet 26 (an example of which is provided in FIG. 7). The inlet 24 can be located about the center of the casing 20. This allows the supply to enter the casing 20 from a certain height, which can be above or below the supply height, as explained below. Optionally, the supply can enter the inlet 24 so as to impact a wall of the casing opposite the location of a supply level regulator, which is also discussed below. Advantageously, this manner of entering the casing 20 via the inlet 24 can allow the supply to accumulate within the casing 20 without impacting the function of the supply level regulator. The outlet 26 can be located substantially at the bottom of the casing 20. In some embodiments, gravity causes the separated liquid to accumulate at the bottom of the casing 20. Therefore, and advantageously, by locating the outlet 26 at the bottom of the casing 20, the separated liquid can be conveyed from the casing 20, and thus the separator 10, via unassisted gravity drainage.

Figure 3:
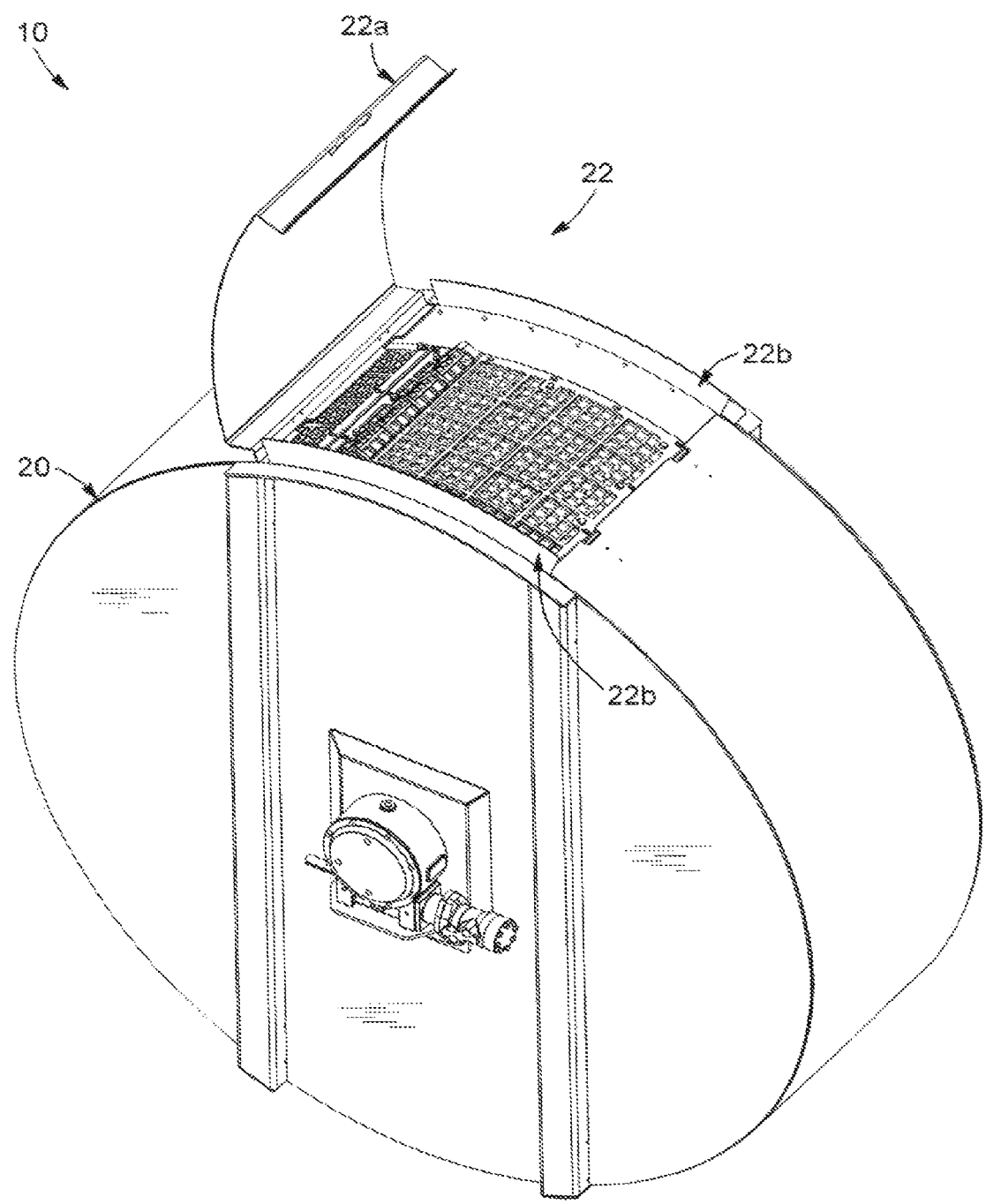
FIG. 3 is a perspective view of an access door for a separator, according to one optional configuration of the present invention.

In some embodiments, the casing 20 has a removable access door 22. The door 22 can permit access to the inside of the casing 20 so as to allow inspection, repair components, perform maintenance, and/or for any other reason. One possible configuration of the access door 22 is provided in FIG. 3. The door 22 can have a covering 22a which interacts with appropriate flanges 22b, seals, gaskets, etc. so as to provide a sealed closure once the covering 22a is brought against the flanges 22b. Such a configuration of the access door 22 can advantageously allow for access to only those parts of the separator 10 which require attention, thus avoiding the necessity of completely uninstalling, dismantling, and/or removing the separator 10 whenever maintenance needs to be performed.

Returning to FIG. 2, the separator 10 also has a screen 30 which is mounted within the casing 20 and rotatable relative to the casing 20. The screen 30 allows for the passage of the liquid, and for the retention of the solid material thereon. As such, the screen 30 can be any suitable filter, taking any suitable form and/or configuration, which allows for these functions to be accomplished. In some embodiments, and as shown in FIG. 2, the screen 30 is a substantially hollow cylinder. Advantageously, such a configuration of the screen 30 allows for its rotation, and allows for more of the supply to be exposed to the surface of the screen 30, thus increasing screening capacity. In another possible configuration, the screen 30 consists of a screening surface 30a, to which are mounted two impermeable walls 30b on either side of the screening surface 30a. The walls 30b allow the screen 30 to remain a "closed" system, such that the liquid is intended to only traverse the screening surface 30a, and is not intended to deviate to the sides of the screening surface 30a. Advantageously, this can allow the supply to more rapidly accumulate within the casing 20. The screen 30 can be made of any suitable material which can resists the cyclical and static forces acting against it, and which can further resist the potentially corrosive nature of the matter it processes. One example of such a material includes stainless steel, being roughly ⅜" thick. Of course, other suitable materials, material combinations, and/or dimensions can also be used.

The screen 30 is mounted within the casing 20. This allows the supply to essentially "immerse" the screen 30 as the supply accumulates within the casing 20. The screen 30 can be separated from an interior surface of the casing 20 by an accumulation distance. This distance can provide spacing between the screen 30 and the casing 20, thereby allowing the separated liquid to accumulate within the volume defined by the accumulation distance. In some optional configurations, this accumulation distance is about 2 inches, uniformly observed about the screen 30.

The screen 30 also rotates with respect to the casing 20. Such a rotation of the screen 30 may advantageously accelerate the processing capacity of the screen 30, especially when compared to screens that do not rotate. The rotation of the screen 30 with respect to the casing 20 can be relative. In one such configuration, the casing 20 is fixed and thus does not rotate, whereas in another possible configuration, the casing 20 can rotate about a fixed screen 30. Where the screen 30 rotates relative to a fixed casing 20, the speed of rotation can be between about 5 rpm and about 10 rpm. More particularly, the speed of rotation can be about 7 rpm. Such a relatively slow rotational speed can advantageously reduce the energy expended to rotate the screen 30, while still allowing for a methodical and efficient separation of the liquid and solid material.

Figure 4:
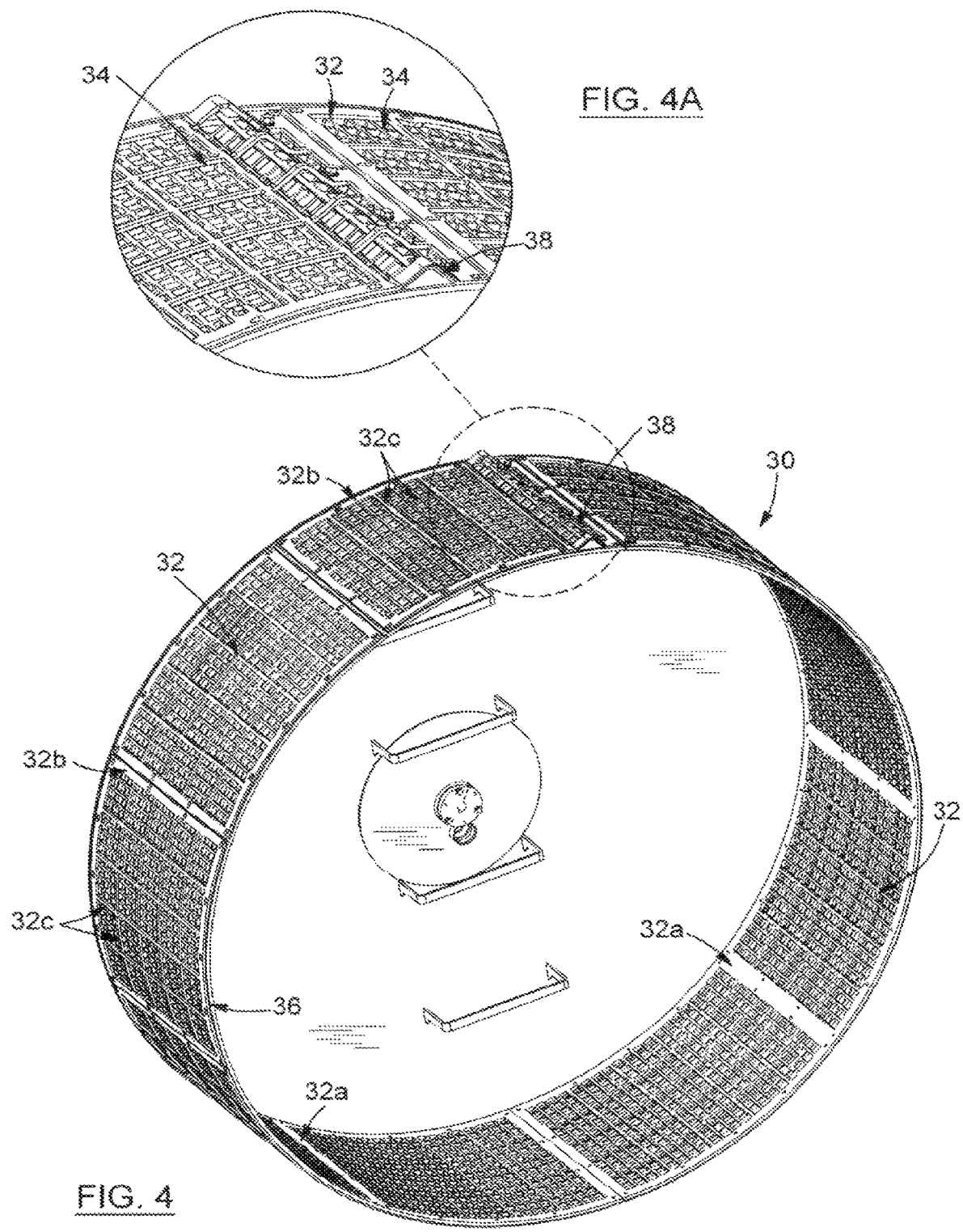

The screen 30 has at least one perforated section 32, an example of which is provided in FIGS. 4 and 4A. The screen 30 can also have many perforated sections 32, such as nine perforated sections 32, for example, each perforated section 32 being interconnected to another perforated section 32 so as to form a perforated surface. Each perforated section 32 allows for the passage of liquid through its surface, while allowing for the retention of the solid material. The liquid may pass through, and the solid material may accumulate on, a plurality of perforations 34. The perforations 34 can be any hole, aperture, passage, cavity, etc. through which the liquid may pass, and on which the solid material can accrue. As such, the perforations 34 can be of any shape or profile for accomplishing such a function. In the example provided in FIG. 4A, the perforations 34 are substantially rectangular, having dimensions of about 1 inch by 1 inch, and are disposed in a grid-like pattern. Furthermore, the layout and/or disposition of the perforations 34 on each perforated section 32 can take any form or configuration.

Figure 8:
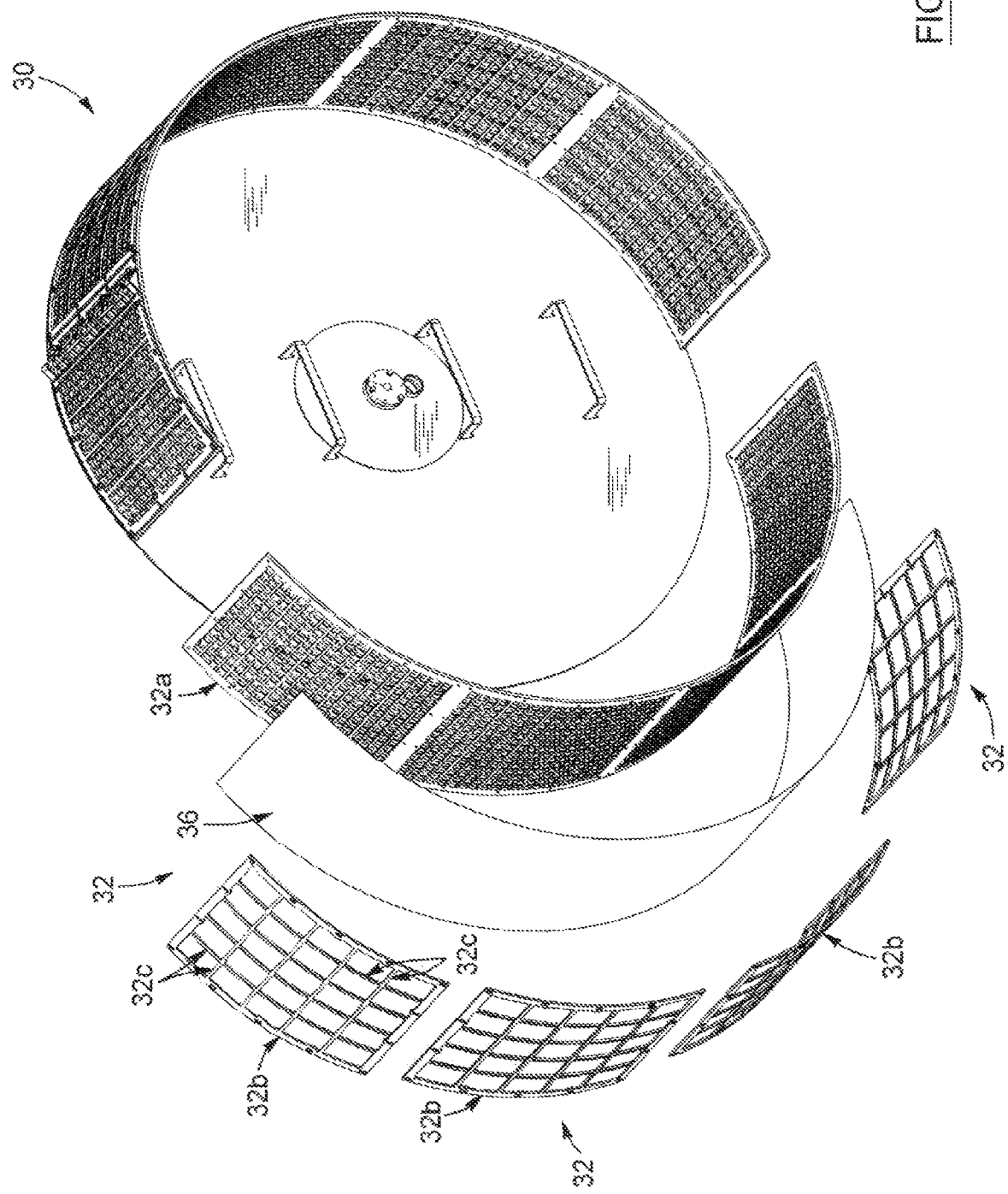
FIG. 8 is a partially exploded perspective view of a perforated section having a mesh, a mesh support, and a filter, according to one optional configuration of the present invention.

One example of a construction of the perforated sections 32 is provided in FIG. 8. In the optional embodiment where the screen 30 is cylindrical, a mesh 32a containing the perforations 34 can be assembled from a plurality of mesh sections. In FIG. 8, two substantially semi-circular mesh sections are assembled together, and the cylindrical shape is closed with another curved mesh section. Thus, a cylindrical mesh 32a consisting of multiple perforations 34 is formed. This cylindrical mesh 32a may be provided with a structural support to enhance its rigidity, for example. Therefore, multiple mesh supports 32b can be mounted to the outside of the mesh 32a. These mesh supports 32b can include intersecting cross members 32c which provide reinforcement to the mesh 32a in the interior of the mesh supports 32b. If more screening is desired, or if a screen finer than that provided by the perforations 34 is required, a filter 36 can be provided between the mesh 32a and the mesh supports 32b. It is understood that the screen 30 and/or perforated sections 32 are not limited to this construction, and any of the mesh 32a, the mesh supports 32b, and/or the filter can be removed, interchanged, or substituted for another component.

It is thus apparent how a perforated section 32 having such a construction can permit passage of the liquid. Indeed, the mesh 32a, and thus the perforations 34, are located closest to the interior of the screen 30, and thus are in contact with the liquid and solid material. As the liquid and/or solid material accumulates on the perforations 34 of the mesh 32a, pressure is applied against the perforations 34/mesh 32a, especially as the volume of supply accumulates within the screen 30, as explained below. The mesh supports 32b may thus advantageously reinforce the mesh 32a when it is subjected to this pressure, allowing for continuous screening of the supply. Returning to FIG. 2, the screen 30 is positioned, shaped, and sized for receiving the supply from the inlet 24 of the casing 20 such that the supply accumulates within the screen 30. The expression "positioned, shaped, and sized" can mean that the screen 30 is constructed, located within the casing 20, and/or mounted thereto, so that the supply can accumulate therein. One example of such a screen 30 construction is described above, where the screen 30 consists of a screening surface 30a, to which are mounted two impermeable walls 30b on either side of the screening surface 30a. The walls 30b allow the screen 30 to remain a "closed" system, such that the liquid is intended to only traverse the screening surface 30a, and is not deviated to the sides of the screening surface 30a. One example of such a screen 30 location is also described above, where the screen 30 can be separated from an interior surface of the casing 20 by an accumulation distance. This distance can provide spacing between the screen 30 and the casing 20, thereby allowing the separated liquid to accumulate within the volume defined by the accumulation distance. It is thus apparent that the "closed" nature of the screen 30 and/or casing 20 allows the supply to accumulate within the screen 30.

When so accumulating, the supply reaches a height within the screen 30, which is referred to herein as the supply height $H_s$. The supply height $H_s$ can vary with the level of the supply within the screen 30. The supply thus forms a volume characterised in one dimension by the supply height $H_s$, and in other dimensions by the width and length of the screen 30. Indeed, in the optional configuration where the screen 30 a cylinder, the screen 30 can have a diameter of about 7 feet and a width of about 2 feet. The volume of fluid collecting over a screen 30 of such dimensions exerts a significant pressure against at least some of the perforated sections 32, and which is designated herein as a screening pressure $P_s$. Examples of the supply height $H_s$ and the screening pressure $P_s$ are provided in FIG. 7.

As with the supply height $H_s$, the screening pressure $P_s$ varies with the volume of supply within the screen 30. The screening pressure $P_s$ can also vary depending on the following non-exhaustive list of other factors: the degree of blockage of the perforations 34, the density of the supply, etc. In some configurations, where the density of the supply is substantially equal to that of liquid water at standard temperature and atmosphere, and when the supply height $H_s$ is at a maximum height of about 0.9 m, the screening pressure $P_s$ can be about 8.5 kPa. The screening pressure $P_s$ can decrease from this value as the volume of liquid in the supply passes through the screen and is not replaced. Indeed, in the field of septic tanks for example, this may occur as the septic tank is nearly emptied. In one optional configuration, where the supply height $H_s$ descends to about 0.7 m, the screening pressure $P_s$ can be about 7.0 kPa.

The screening pressure $P_s$ acts against at least one perforated section 32, thereby compacting the solid material against that perforated section 32 and/or its perforations 34. In the optional configuration where the screen 30 is cylindrical in shape, it is understood that the screening pressure $P_s$ will be greatest when acting against the bottom-most perforated section 32, and will be of a lower value when acting against those perforated sections 32 elevated from the bottom of the screen 30. It is further understood that the screening pressure $P_s$ acting against the perforated sections 32 can vary as the perforated sections 32 are rotated. In many optional configurations, the solid material tends to accumulate near the bottom of the screen 30, and as previously explained, it is at this point of the screen 30 where it may feel the highest screening pressure $P_s$. The screening pressure $P_s$ at this location may level out the solid material by compacting it against the perforated sections 32/perforations 34, which may press, squeeze, force, etc. the liquid within the solid material out of the solid material as well, further dehydrating the solid material. Thus, the liquid passes through the perforations 34, and the solid material accumulates thereon. The liquid is thus separated from the solid material.

Returning to FIG. 2, the separator 10 also has a suction unit 40 disposed or located within the screen 30. The suction unit 40 extracts, removes, sucks, etc. the solid material compacted against the screen 30, thereby unblocking the perforations 34 of the screen 30 so that the liquid may be continuously separated from the supply by the screen 30. As such, the suction unit 40 can be any machine, vacuum, aspirator, etc. which creates a pressure differential allowing for the inhalation or "vacuuming" of the solid material. In some configurations, the suction unit 40 can apply between about 5 and about 10 lbs. of pressure. One optional configuration of the suction unit 40 is provided in FIG. 5. The suction unit 40 has an elongated suction shaft 42, which extends a certain distance and which ends in a suction head 44. The suction shaft 42 can be any tube, conduit, duct, flue, etc. which conveys the aspirated solid material from the suction head 44 and out of the screen 30. As such, it can take any form which can perform such functions. In the optional embodiment shown in FIG. 5, the suction shaft 42 is tubular, and includes a substantially 90-degree bend between the portion of the suction shaft 42 connecting to the suction head 44, and the portion exiting the screen 30. In some optional embodiments, the suction shaft 42 is positioned at an angle $\Theta$ relative to a vertical line. The value of the angle $\Theta$ may vary anywhere from between about 84 degrees and about 135 degrees. Indeed, the angle $\Theta$ need not fall within this range, and can vary provided that the solid material remains within the perforations.

The suction head 44 can be any cap, crown, tip, etc. which can aspire and/or suck the solid material compacted within the perforations 34. The suction head 44 is located above the supply height $H_s$. In such a location, the suction head 44 is kept above the level of the supply within the screen 30, and the suction head 44 is thus prevented from extracting the liquid component of the supply, and can thus only extract the solid material. The suction head 44 is located within an extractable distance from the perforations 34 of the screen 30. The expression "extractable distance" refers to any distance of the suction head 44 from the perforations 34/perforated section 32 at which the suction head 44 can sufficiently extract the solid material from the perforations 34 so as to unblock the perforations 34 and permit the continued screening of the supply. As such, the extractable distance can vary, and its value can depend on the following non-exhaustive list of factors: the suction force of the suction unit 40, the properties of the solid material, the rate of rotation of the screen 30, the desired extraction rate, etc. Indeed, in some optional configurations, the extractable distance can be substantially zero, such that the suction head 44 is in contact with the perforations 34/perforated section 32. In some optional configurations, the suction head 44 has a suction extension 46, which can be attached to the suction head 44. The suction extension 46 can be made of any suitable substantially rigid material, such as rubber. The suction extension 46 can span the extractable distance, thereby creating a sealed contact between an end of the suction head 44 and the surface of the perforated section 32. In so doing, the suction extension 46 may advantageously allow for the suction unit 40 to maintain and/or enhance the suction pressure applied. The suction extension 46 may perform such an operation as the screen 30 rotates.

In some embodiments of the invention, and referring to FIGS. 4 and 4A, at least one perforated section 32 of the screen 30 has a perforated notch 38. The notch 38 can be any indentation, cleft, groove, indent, etc. in the perforated section 32 which projects away from the center and/or inside of the screen 30, and which allows for the selective passage of liquid. As such, the notch 38 can be a V-shaped projection which projects from the perforated section 32, and which forms an apex. The notch 38 can also span some of the width of the perforated section 32, all of the width, and/or any combination thereof. For example, in some embodiments, the notch 38 could have a width substantially matching the width of the suction head 44. Alternatively, the width of the notch 38 could exceed that of the suction head 44. It is apparent that many such notch 38 widths are possible. Although the embodiments of FIGS. 4 and 4A show only one notch 38, a screen 30 and/or perforated section can have a plurality of notches 38, if so required. In one such configuration, two notches 38 can be provided on the screen 30, each notch 38 being located opposite the other.

Returning to FIG. 2, the separator 10 has a supply level regulator 50 which is mountable within the screen 30. The supply level regulator 50 can be any device, instrument, tool, sensor, etc. which measures the level of the supply within the screen 30, and regulates the level such that it is maintained below the supply height $H_s$. In so doing, the level of the supply never surpasses the established supply height $H_s$, thereby ensuring that the suction unit 40 never extracts the liquid of the supply, among other advantages.

Figure 5:
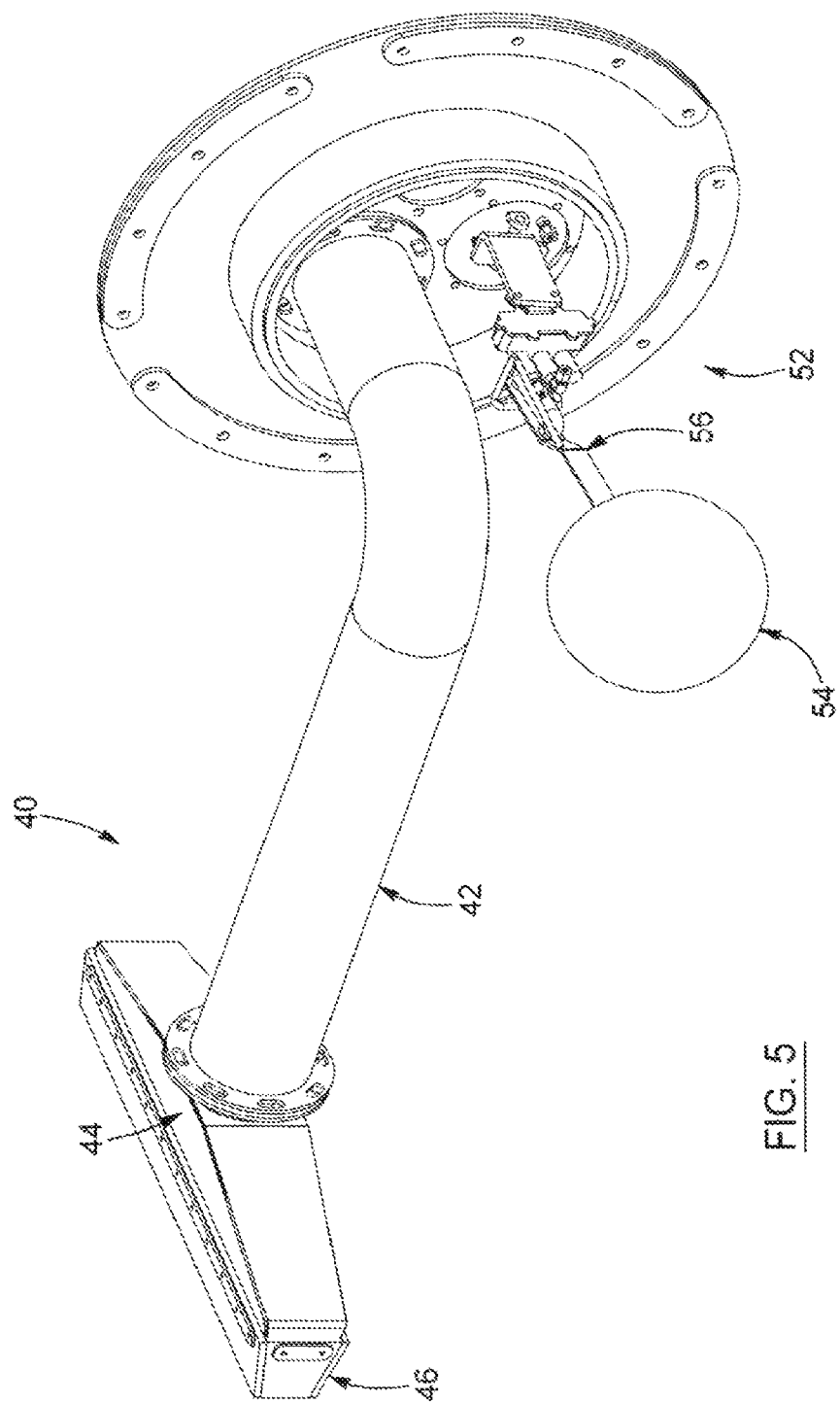
FIG. 5 is a perspective view of a suction unit and a supply level regulator, according to one optional configuration of the present invention.

One possible technique by which the supply level regulator 50 may regulate the level of the supply is through the use of a float gage 52, an example of which is shown in FIG. 5. The float gage 52 has a float 54 in contact with the supply. The float 54 can form the end of a float arm 56. The float 54 can be positioned lower than the supply height $H_s$. As the level of supply rises in the screen 30, the float 54 rises along with it. When the float 54 reaches a certain trigger height, which can be lower than the supply height $H_s$, the float arm 56 attached to the float 54 is also raised. The raising of the float arm 56 triggers a mechanism which can stop the flow of supply into the screen 30 via the inlet 24. In one example of such a trigger, the raising of the float arm 56 sends a pneumatic "stop" signal to a gate valve through which the supply enters the screen 30. Other examples of trigger techniques are also within the scope of the present invention. This ensures that the level of the supply in the screen 30 does not surpass the supply height $H_s$. By stopping the flow of the supply, a delay is created during which the screen 30 can process the volume of supply so as to lower its level. Once the level of the supply lowers, and thus the height of the float 54, the float arm 56 no longer triggers the mechanism, and flow of supply into the screen 30 can continue. It is apparent that the supply level regulator 50 may regulate the level of the supply in any other suitable manner. Indeed, in one possible configuration, the supply level regulator 50 operates continuously, such that when it is triggered, it simply reduces the flow rate of the supply to the screen 30, and then raises the flow rate when not triggered, thereby continuously maintaining the supply at a given level within the screen 30.

Figure 6:
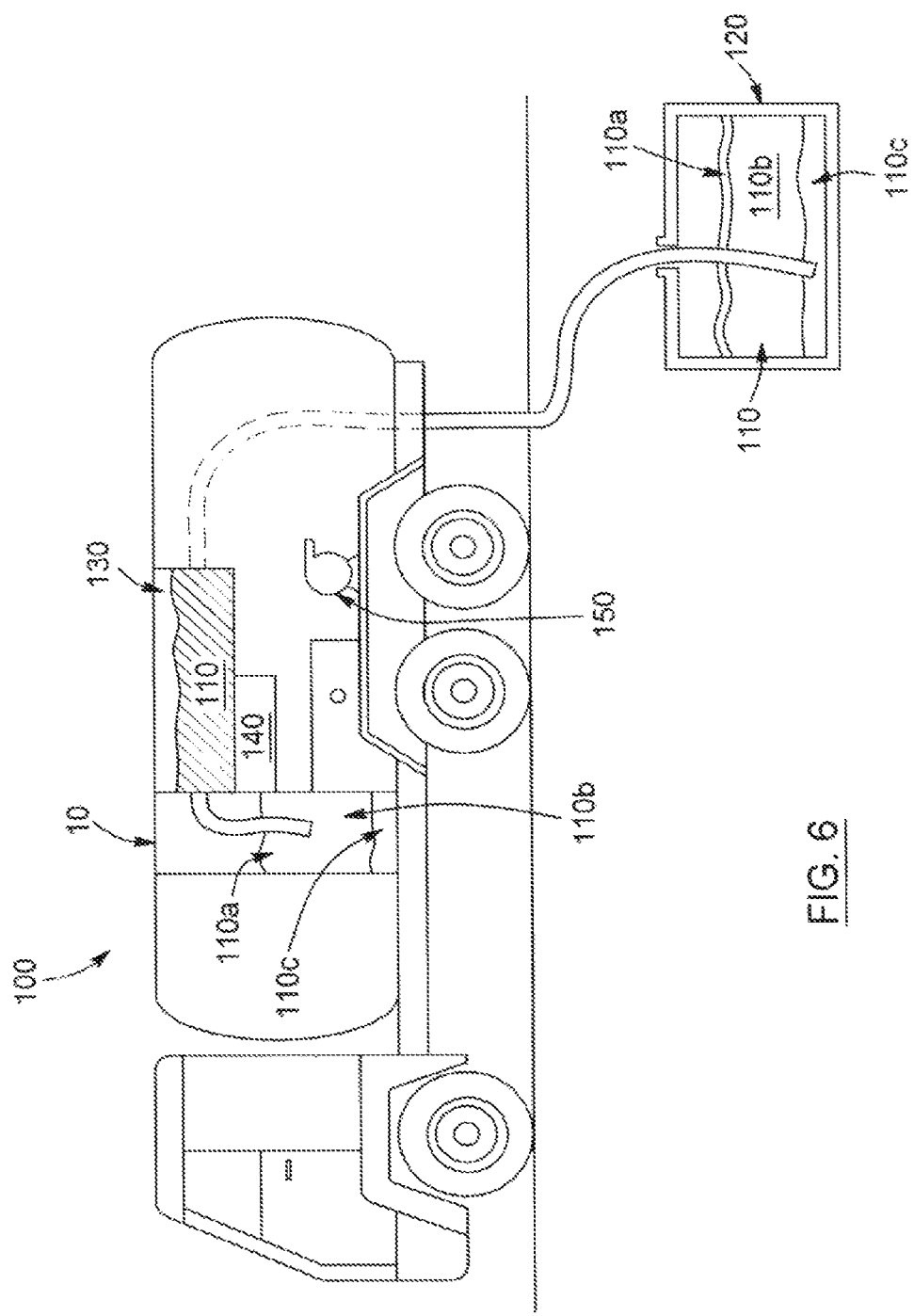
FIG. 6 is a schematic side elevational view of a mobile unit for separating a supply, according to another optional configuration of the present invention.

In one optional configuration, and as exemplified in FIG. 6, there is provided a mobile unit 100 for separating the supply 110 provided by a source 120, and which returns the supply 110 to the source 120. The mobile unit 100 can be any truck, haul, vehicle, etc. which can self-displace to a location near the source 120, and which can transport, cart away, remove, etc. the separated solid material to a suitable dumping site. The supply 110 can be similar to the one described above. In the particular example of a septic tank, the supply 110 can consist of a layer of floating solids 110a, a layer of settled solids 110c (both solids 110a,110c being referred to herein as "solid material 110a,110c"), and a liquid layer 110b in between. The source 120 can be any suitable container or storage for the supply 110, such as a septic tank.

The mobile unit 100 includes a separator 10 such as the one described herein.

The separator 10 can be mounted to the mobile unit 100, such as via a frame. A feed tank 130 receives the supply 110 from the source 120, and is in fluid communication with the separator 10 so that it may feed the supply 110 to the separator 10. In some optional configurations, the feed tank 130 is positioned higher than the separator 10, which allows the feed tank 130 to feed the supply 110 to the separator 10 by gravity. Alternatively, the feed tank 130 can feed the separator 10 via a pressurized unit, such as a pump. The feed tank 130 can be of any capacity, configuration, and/or shape. In one possible configuration, the feed tank 130 has a capacity to store roughly 750 gallons, which can correspond to the average capacity of a septic tank. This advantageously allows for the entire contents of a septic tank to be emptied into such a feed tank 130, which can improve processing times. The mobile unit 100 also includes a solid material container 140, which is operatively connected to the suction unit 40 of the separator 10 so as to store the solid material 110a,110c extracted by the suction unit 40. The location of the solid material container 140 can vary depending on numerous factors such as the hauling capacity of the mobile unit 100, the available space on the mobile unit 100, the size of the solid material container 140, etc. In some optional configurations, the solid material container 140 is located just below the feed tank 130, as exemplified in FIG. 6.

Furthermore, the mobile unit 100 contains at least one pump 150 which is in fluid communication with the feed tank 130 and with the source 120 so as to pump the supply 110 from the source 120 and into the feed tank 130. The pump 150 may also return the liquid 110b separated by the separator 10 to the source 120.

Having described some of the optional features and components of the separator 10, the operation of the separator 10 will now be described in reference to FIG. 7, and according to another aspect of the present invention, which relates to a method for separating a heterogeneous supply into a liquid and solid material.

The method includes step a), which relates to accumulating the supply 110 within the rotatable screen 30. The supply 110 can be provided to the screen 30 through the inlet 24 of the casing 20, which can arrive via gravity drainage from a feed tank, as but one example. A suitable tube or other device can direct the supply 110 away from the supply level regulator such that the entering supply 110 does not interfere with the operation of the supply level regulator.

The level of the supply 110 rises within the screen 30 as the supply 110 is continuously fed into the screen 30. As this occurs, the liquid 110b may immediately pass through the screen 30 and exit via the outlet 26 of the casing 20, thus limiting the rise in the level of the supply 110. This separated liquid 110b can be returned to the source from whence it came, via a pump, for example. Upon entering the screen 30, the supply 110 may separate into its constituent elements, with the settled solids 110c sinking directly to the bottom of the screen 30, and the floating solids 110a floating upon a layer of the liquid 110b. With the addition of more supply 110, and the blocking of the perforations by the solid material 110a,110c, the level of the supply 110 may rise within the screen 30 until it reaches the supply height $H_s$. The screening pressure $P_s$ may thus increase and compact the solid material 110a,110c against the perforations/perforated sections of the screen 30, as previously explained.

The method also includes step b), which relates to maintaining the level of the supply 110 within the screen 30 at or below the supply height $H_s$. This can be achieved with a device such as the supply level regulator described above. If the level of the supply 110 rises above the supply height $H_s$ and/or a certain trigger height, step a) can be interrupted at least temporarily, and the flow of the supply 110 can be interrupted, thereby permitting the screen 30 to process the supply 110 already within it, and thus lower its level. Once sufficiently lowered, the feeding of the supply 110 can resume.

The method also includes step c), which relates to rotating the screen 30 and the settled solid 110c compacted thereon. The rotation can occur in the direction indicated by the arrow in FIG. 7. It is understood that the floating solid 110a may only contact the screen 30 and/or perforations once all the liquid 110a has been separated by the screen 30. At this point, the floating solid 110a will be rotated by the screen 30, along with any remaining settled solid 110c. Such a rotation can be performed at a speed between about 5 rpm and about 10 rpm, or at about 7 rpm.

The method also includes step d), which relates to extracting the solid material 110a,110c from the rotating screen 30 when the solid material 110a,110c is rotated above the supply height $H_s$. It is now apparent that the solid material 110a,110c blocks the perforations and prevents the liquid 110b from passing through. There is thus a need to unblock the perforations so as to allow the liquid 110b to continuously be separated. The solid material 110a,110c is thus extracted from the perforations/rotating screen 30, via techniques such as vacuuming, as described above. This extraction is performed when the solid material 110a,110c is rotated above the supply height $H_s$, and thus above the level of the supply 110 within the screen 30. In a typical operation, as the solid material 110a,110c rotates along with the screen 30, it eventually exits from the supply 110 and is brought closer to the suction action of the suction head of the suction unit 40, at which point the solid material 110a,110c is sucked from the perforations/screen 30, thereby unblocking them. The screen 30 and/or perforations are thus significantly unblocked of solid material 110a,110c, and are thus able to continue allowing the liquid 110b to penetrate therethrough. The screen 30 thus continues to rotate, and returns to the supply 110 in a "cleaned" condition.

It may sometime occur that certain solid material 110a, 110c cannot be extracted using this technique. This may be the case where the solid material 110a,110c consists of small rocks, hardened debris, etc. which are too dense to be compacted into the perforations and/or too large to pass underneath the suction head to be extracted. This may also be the case where the solid material 110a,110c "rolls up" against itself as it abuts against the suction head 44 and/or suction extension 46. In such situations, the screen 30 may be provided with a notch 38, such as the one described above, which allows such un-extracted solid material 110a, 110c to fall within the notch 38 and be secured therein. The notch 38, being indented away from the center of the screen 30, thus allows the un-extracted solid material 110a,110c to nestle therein so as to pass underneath the suction head along with the notch 38. Once underneath the notch 38, the un-extracted solid material 110a,110c can then be sucked by the suction unit 40. The notch 38 can thus advantageously self-clean the screen 30 of difficult to extract solid material 110a,110c, and thus improve the screening capacity of the screen 30.

Furthermore, the separator 10 and method described herein provide certain advantages over the prior art in that, by virtue of their design, steps, and components, the separator 10 and method allow for the rapid emptying of a source, such as a septic tank, and the return of beneficial liquid thereto.

Indeed, the relatively large size of the screen 30 (about 7 feet in some optional configurations), allows the screen 30 to accept a large volume of supply, which in some instances is the entire capacity of the source. The greater size of the screen 30 also results in a greater volume of the supply being exposed to the screen 30, which can increase screening capacity. Furthermore, the rotation of the screen 30 allows for faster screening of the supply when compared to stationary screens. The ability to rotate the screen 30 slowly, for example at about 7 rpm, also procures important energy savings.

Furthermore, the use of multiple perforated sections 32, and the access door 22, can allow for more rapid repairs and/or maintenance of the screen 30. Indeed, should a particular perforation or group of perforations need repairing, the access door 22 provides for easy access to such items without the need to dismantle the separator 10. The use of multiple perforated sections 32 allows for their easy replacement should one so require it, without the need to replace the screen 30 and/or filter 36 as a whole.

It can thus be appreciated that the separator 10 and method described herein allow for the complete emptying, processing, and return of liquid from a septic tank, for example. Indeed, and contrary to some existing systems, there is no need to "pre-filter" the supply coming from the tank by first removing the floating solid layer. The separator 10 and method described herein advantageously allow a person to simply empty the supply into the screen 30 so as to separate the liquid therefrom. This further advantageously allows the separator 10 and method to be performed by a non-specialized technician, thus increasing access and potentially lowering costs.

This further allows for a quicker emptying of a septic tank when compared to known systems. Indeed, in some optional configurations, a standard 750 gallon septic tank can be emptied in under ten minutes, whereas some known systems can take hours. Such rapid emptying is further assisted by gravity feeding from the feed tank of a mobile unit, which eliminates the need for additional mechanical components (i.e. pump, piping, etc.), and thus may lower costs.

Of course, numerous modifications could be made to the above-described embodiments without departing from the scope of the invention, as defined in the appended claims.

The invention claimed is:

1. A separator for separating a heterogeneous supply into a liquid and a solid material and for extracting the solid material, the separator comprising:
    a casing containing the supply, the casing comprising an inlet to receive the supply and an outlet to convey liquid out from the casing;
    a screen mountable within the casing and rotatable relative to the casing, the screen comprising at least one perforated section, the at least one perforated section comprising a plurality of perforations disposed thereabout so as to permit passage of liquid therethrough, the screen being positioned, shaped, and sized to receive the supply from the inlet of the casing such that the supply accumulates within the screen to a supply height, the supply thereby providing a screening pressure acting against the at least one perforated section so as to compact the solid material against the perforations while the liquid passes therethrough, thereby separating the liquid from the solid material;
    a suction unit disposed within the screen, the suction unit comprising a suction head disposed above the supply height and positioned to extract the solid material from the perforations as the at least one perforated section rotates within an extractable distance from the suction head; and
    a supply level regulator mountable within the screen, the supply level regulator regulating a level of the supply within the screen so as to maintain the level of the supply below the supply height.

2. The separator according to claim 1, wherein the at least one perforated section comprises a perforated notch.

3. The separator according to claim 2, wherein the perforated notch spans at least part of a width of the at least one perforated section.

4. The separator according to claim 2, wherein the perforated notch is a substantially V-shaped projection projecting from the at least one perforated section in a direction away from a center of the screen.

5. The separator according to claim 1, wherein the at least one perforated section comprises a plurality of interconnectable perforated sections.

6. The separator according to claim 1, wherein the suction shaft is disposed at an angle between about 84 degrees and about 135 degrees relative to a vertical line.

7. The separator according to claim 1, wherein the suction head comprises a suction extension extending from an end of the suction head to the at least one perforated section thereby forming a sealed contact between the suction head and the at least one perforation.

8. The separator according to claim 1, wherein the casing comprises a removable access door for access inside the casing.

9. The separator according to claim 1, wherein the inlet of the casing is disposed about a center of the casing such that the screen receives the supply below the supply height.

10. The separator according to claim 1, wherein the perforations are substantially rectangular.

11. The separator according to claim 1, wherein the screen is a substantially hollow cylinder having a diameter of about 7 feet.

12. The separator according to claim 1, wherein the screen rotates at a rate between about 5 rpm and about 10 rpm.

13. The separator according to claim 1, wherein a filter is placed upon the at least one perforated section.

14. The separator according to claim 1, wherein the screening pressure is about 7.0 kPa to about 8.4 kPa.

15. The separator according to claim 1, wherein the supply level regulator comprises a float gage.

16. A mobile unit to separate the supply provided by a source and to separate the supply to said source, the mobile unit comprising:
    a separator according to claim 1 mounted to a frame of the mobile unit;
    a feed tank in fluid communication with the separator, the feed tank feeding the supply to the separator;
    a solid material container operatively connected to the suction unit of the separator, the solid material container storing the solid material extracted by the suction unit; and
    a pump in fluid communication with the feed tank, the pump retrieving the supply from the source and returning the separated liquid to the source.

17. The mobile unit according to claim 16, wherein the feed tank is positioned higher than the separator so as to feed the supply to the separator via gravity.

* * * * *